United States Patent
Choi (10) Patent No.: US 8,032,180 B2
(45) Date of Patent: Oct. 4, 2011

(54) BROADCAST RECEPTION METHOD AND APPARATUS

(75) Inventor: Yong Seock Choi, Seoul (KR)

(73) Assignee: Samsung Electronics Co., Ltd., Maetan-dong, Yeongtong-gu, Suwon-si, Gyeonggi-do (KR)

( * ) Notice: Subject to any disclaimer, the term of this patent is extended or adjusted under 35 U.S.C. 154(b) by 879 days.

(21) Appl. No.: 11/952,168

(22) Filed: Dec. 7, 2007

(65) Prior Publication Data

US 2008/0300017 A1 Dec. 4, 2008

(30) Foreign Application Priority Data

Jun. 1, 2007 (KR) ........................ 10-2007-0053666

(51) Int. Cl.
 *H04B 1/38* (2006.01)
 *H04M 1/00* (2006.01)

(52) U.S. Cl. ........ 455/557; 455/558; 455/411; 455/3.01

(58) Field of Classification Search ................. 455/3.01, 455/3.02, 3.03, 411, 420, 514, 67.11, 550.1, 455/552.1, 558, 556.1, 557, 556.2, 3.04, 455/3.06; 370/350, 503; 726/26, 27; 705/26, 705/310
See application file for complete search history.

(56) References Cited

U.S. PATENT DOCUMENTS 7,490,067 B1 * 2/2009 Huber et al. .................... 705/51
2010/0153730 A1 * 6/2010 Goria ............................ 713/173

FOREIGN PATENT DOCUMENTS

| JP | 2002-368871 | 12/2002 |
| JP | 2006-238247 | 9/2006 |
| KR | 2004-36367 | 4/2004 |
| KR | 10-0748470 | 8/2007 |

* cited by examiner

*Primary Examiner* — John J Lee
(74) *Attorney, Agent, or Firm* — Cha & Reiter, LLC (57) ABSTRACT

A digital broadcast reception method and apparatus for a user equipment (UE) including a Subscriber Identity Module (SIM). The SIM stores files associated with a digital broadcast service and a mobile equipment for executing a broadcast application using the files. The method and apparatus eliminates previously required cumbersome user manipulation receiving a pay program by storing the application and files associated with the digital broadcast service.

14 Claims, 6 Drawing Sheets

BROADCAST RECEPTION METHOD AND APPARATUS

CLAIM OF PRIORITY

This application claims priority under 35 U.S.C. §119 to an application entitled "BROADCAST RECEPTION METHOD AND APPARATUS," filed in the Korean Intellectual Property Office on Jun. 1, 2007 and assigned Serial No. 2007-0053666, the contents of which are incorporated herein by reference in its entirety.

BACKGROUND OF THE INVENTION

1. Field of the Invention

The present invention relates to a mobile terminal (user equipment). More particularly, the present invention relates to a digital broadcast reception method and apparatus for equipment using a Subscriber Identity Module (SIM).

2. Description of the Related Art

A SIM Application Toolkit (SAT) is a set of commands and procedures programmed into a SIM card that provides the user with various service applications. The SAT also provides a communication interface between the SIM and a Mobile Equipment (ME) and network.

The SAT is suitable for use when both the SIM and ME are adapted to support communications via the SAT. The SIM sends execution commands to the ME for enabling communication with the user.

The $3^{rd}$ Generation Partnership Project (3GPP) Technical Specification (TS), particularly, 3GPP TS 31.111 "USIM Application Toolkit (USAT)" and 3GPP TS 11.14 "Specification of the SIM Application Toolkit for the Subscriber Identity Module-Mobile Equipment (SIM-ME) interface" have defined the commands exchanged between SAT and SIM. The commands are categorized proactive commands sent from the SIM to the ME and envelop commands sent from the ME to the SIM.

The proactive commands include items such as Display Text, Get Inkey, Get Input, More Time, Play Tone, Poll Interval, Refresh, Set Up Menu, Select Item, Send SM, Send SS, Send USSD, Set Up Call, Polling Off, Provide Local Information, Set Up Event List, Perform Card APDU, Power Off Card, Power On Card, Get Reader Status, Timer Management, Set Up Idle Mode Text, Run At Command, Send DTMF, Language Notification, Launch Browser, Open Channel, Close Channel, Send Data, Get Channel Status, Service Search, Get Service Information, Declare Service, etc. The Envelop commands include Data Download to SIM, Menu Selection, Call Control by SIM, Timer Expiration, Event Download, etc.

In the meantime, mobile operators have developed SIM application services developed on the basis of the commands and provide in the form of supplementary services.

However, current 3GPP specifications do not specify a SIM file format and SIM-ME communication protocol for digital broadcasts, whereby the SAT is restricted for operation in the user equipment.

SUMMARY OF THE INVENTION

The present invention has been made in part to solve at least some of the above problems and provide the advantages described herein below. The present invention provides a broadcast reception method and a user equipment apparatus of a mobile terminal (e.g., user equipment, or UE).

In accordance with an exemplary aspect of the present invention, the above and other objects are accomplished by an apparatus comprising user equipment according to the present invention. The user equipment includes a subscriber identity module (SIM) for storing files associated with a digital broadcast service and a mobile equipment for executing a broadcast application using the files.

In accordance with another exemplary aspect of the present invention, the above and other objects are accomplished by a broadcast reception method for user equipment. The broadcast reception method includes displaying a menu list having menu items associated with a digital broadcast service and selectively executing files corresponding to the menu items, the file being stored in the subscriber identity module.

BRIEF DESCRIPTION OF THE DRAWINGS

The above features and advantages of the present invention will be more apparent from the following detailed description in conjunction with the accompanying drawings, in which.

DETAILED DESCRIPTION

Some exemplary embodiments of the present invention are described herein below with reference to the accompanying drawings. The same reference numbers are used throughout the drawings to refer to the same or like parts. For the purposes of clarity and simplicity, detailed descriptions of well-known functions and structures incorporated herein may be omitted to avoid obscuring appreciation the subject matter of the present invention.

The following definitions are provided only to enable a clear and consistent understanding of the detailed description and the claims. Unless otherwise noted, terms should be interpreted according to conventional usage by those skilled in the relevant art. While the invention is shown and described with reference to certain exemplary embodiments thereof, it will be understood by those skilled in the art that various changes in form and details may be made therein without departing from the spirit of the invention and the scope of the appended claims.

In the following descriptions, 3GPP specifications may be partially accommodated for implementing the present invention.

In the following exemplary embodiments, the menu items and files associated with the digital broadcast service are typically stored in a user identity card such as SIM, Universal SIM (USIM), and user identity module (UIM). The user identity card facilitates coping with the situation such as broadcast system change, mobile operator change, or mobile terminal change. In other words, the user identity card allows flexibly modifying and updating menus and files for specific applications using an Over-The-Air (OTA) technology.

In a case of operating the user identity card with a digital broadcast service, the pay broadcast playback procedure, which typically requires cumbersome multiple steps, can be simplified.

Figure 1:
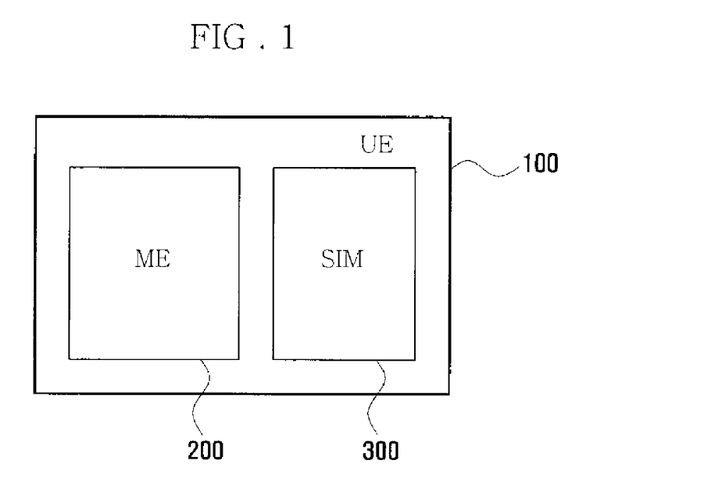
FIG. 1 is a schematic block diagram illustrating an overview of an exemplary configuration of user equipment (UE) according to an exemplary embodiment of the present invention.

FIG. 1 is a schematic block diagram illustrating a configuration of a user equipment (UE) according to an exemplary embodiment of the present invention.

Referring to FIG. 1, a UE 100 typically includes a mobile equipment (ME) 200 and a SIM 300. The ME 200 can be provided with a Mobile Termination (MT) (not shown) for performing radio transmission termination in radio communication system and a Terminal Equipment (TE) (not shown) for performing an end-to-end communication. In this exemplary embodiment, the ME 200 is additionally provided with a digital broadcast reception unit 220 (shown in FIG. 2) and explained in detail hereinafter.

The SIM 300 can be provided, for example, with additional applications in various storage sizes. Although the broadcast reception apparatus and apparatus are described with a SIM in this exemplary embodiment, it should be appreciated that the present invention may also be implemented with a USIM and UIM.

In this exemplary embodiment, it is to be understood that the UE 100 supports the SAT and USAT. As specified in the 3GPP TS 31.111 "USIM" Application Toolkit (USAT) and 3GPP TS 11.14 "Specification of the SIM application Toolkit for the Subscriber Identity Module-Mobile Equipment (SIM-ME) interface," the commands for executing the (U) SAT categorized into the proactive commands sent from the SIM 300 to ME 200 and envelope commands sent from the ME 200 to SIM 300.

The communication between the ME 200 and SIM 300 is performed using proactive commands and envelope commands specified in the SAT and USAT standards, and the proactive commands and envelope commands specified in the standards would be understood by a person of ordinary skill in the art. In association with the digital broadcast service, new proactive commands and envelope commands can be defined. Although the broadcast reception method and apparatus according to the present invention are described with the SAT in the following description, a person of ordinary skill in the art will understand and appreciate that the present invention can be implemented with the USAT.

Figure 2:
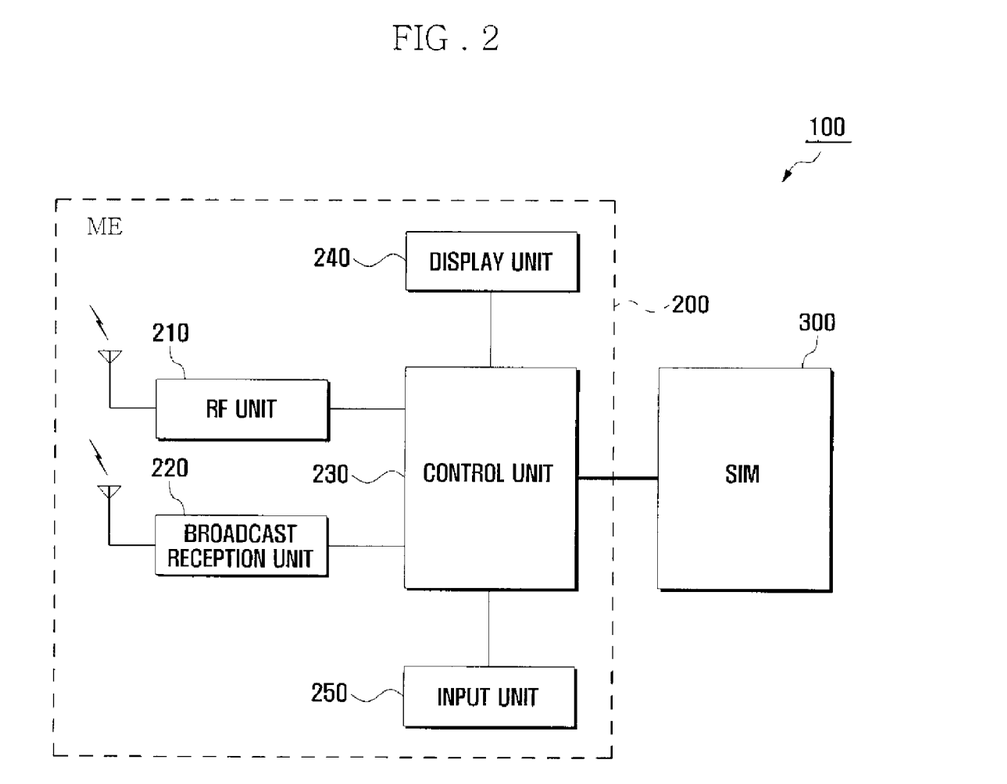
FIG. 2 is a block diagram illustrating detail of the exemplary configuration of UE shown in FIG. 1.

FIG. 2 is a block diagram illustrating the exemplary configuration of the UE of FIG. 1 in greater detail.

Referring now to FIG. 2, the UE 100 includes an ME 200, which is shown in grater detail, and SIM 300. The ME 200 includes a radio frequency (RF) unit 210, a broadcast reception unit 220, a control unit 230, a display unit 240, and an input unit 250.

The RF unit 210 is responsible for transmitting and receiving radio signals. The RF unit 210 is typically provided with an RF module and a baseband module (not shown). The RF module typically includes an RF transmitter for up-converting and amplifying radio signals to be transmitted and an RF receiver for low noise-amplifying and down-converting the received radio signals. The baseband module performs channel coding, interleaving, and modulation on the transmission signals and outputs to the RF module, and performs demodulation, equalization, channel decoding, and deinterleaving on the signal received through the RF module.

The broadcast reception unit 220 provides reception of broadcast signals. The broadcast reception unit 220 receives the broadcast signals through a physical channel set under the control of the control unit 230. The broadcast reception unit 220 is configured to selectively receive the broadcast data of the service channel selected by a subscriber. Subsequently, the broadcast reception unit 220 processes the broadcast data so as to output video, audio, and broadcast information that has been separated from the broadcast data. The broadcast data can be, for example, an Electronic Program Guide (EPG) and/or the Electronic Service Guide (ESC) according to the digital broadcast system, i.e. the Digital Multimedia Broadcasting (DMB) and Digital Video Broadcasting-Handheld (DVB-H).

Although the broadcast reception method and apparatus of the present invention are described in association with the DVB-H system and ESG in this exemplary embodiment, a person of ordinary skill in the art understands and appreciates that the present invention may also be applied to, for example, the DMB system.

Still referring to FIG. 2, the control unit 230 controls cooperative signaling between the internal units including the RF unit 210 and broadcast reception unit 220. The control unit 230 can be provided, for example, with a supplementary function module for distributing some of the control functions. Also, the control unit 230 can be provided with an access module for accessing to the SIM 300 and a reading module for reading field values of the files contained in the SIM 300.

The ME 200 may also be provided with a storage medium such as a memory for storing the user data and application programs. The ME 200 may further include at least one: of a memory slot for receiving an external memory card, a camera module, a data connector for data exchange with an external device, a charge connector for charging power, or a music player module, for example, an MP3 module.

Although all the applicable supplementary function modules have not been enumerated, it is noted that various supplementary function modules can converge into the ME 200. The control unit 230 may perform a roll of central controller for controlling multimedia application processors, memory, display unit 240, input unit 250, and their cooperation.

The control unit 230 may also be provided with a SIM card interface (not shown), for interfacing with the SIM 300, such that, if the UE is powered on, the control unit 230 receives various application information and data stored from the SIM 300 through the SIM card interface. In this particular exemplary embodiment, the application information and data including field values of the files associated with the digital broadcast service. Such data communication is performed according to the SAT standard.

The SIM 300 is preferably implemented with a removable card so as to be changeably attached to the ME 200. For example, the SIM 300 can be implemented in the form of a Universal Integrated Circuit Card (UICC) or an ICC. The SIM 300 is a smartcard as a standalone device having computation and storage functionalities. The storage functionality can be implemented with an Electrically Erasable and Programmable Read Only Memory (EEPROM), Random Access Memory (RAM), or Read Only Memory (ROM). The computation functionality can be implemented with a central processing unit (CPU).

The SIM 300 also preferably stores the files associated with the broadcast reception method for a digital broadcast service according to an 1s exemplary embodiment of the present invention. The digital broadcast service related files are formatted in a SIM or USIM file format. The files are classified into Master File (MF), Dedicated File (DF), Elementary File (EF), and Application Dedicated File (ADF).

The MF is a root of the file system to provide a main directory. The DF is a directory in which other files which logically belong together (DF and EF) are grouped. The EF contains actual data that are typically required for applications. The ADF is the entry point for an application.

The files for the digital broadcast service can be structured in a hierarchical architecture.

Figure 3A:
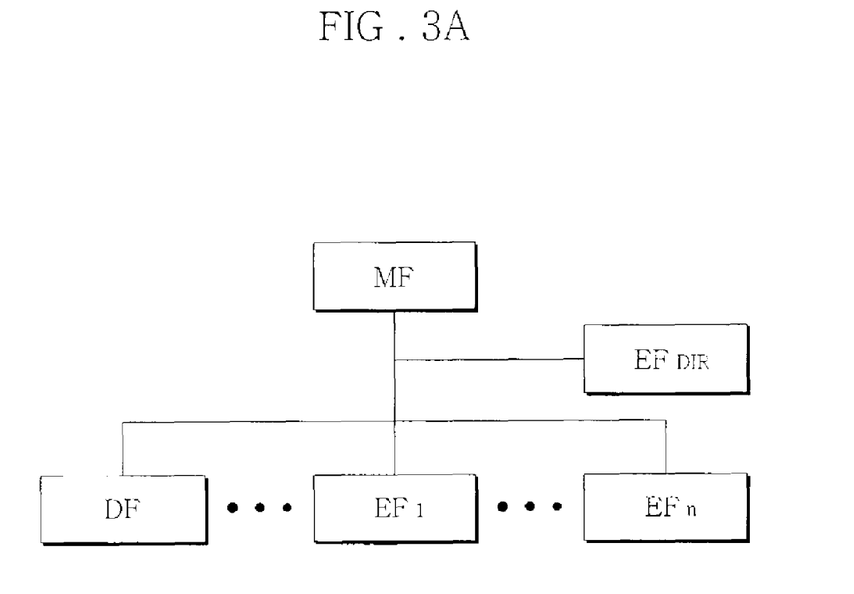
FIGS. 3A and 3B are conceptual view illustrating structures of a hierarchical file system for broadcast reception method and apparatus according to an exemplary embodiment of the present invention.
Figure 3B:
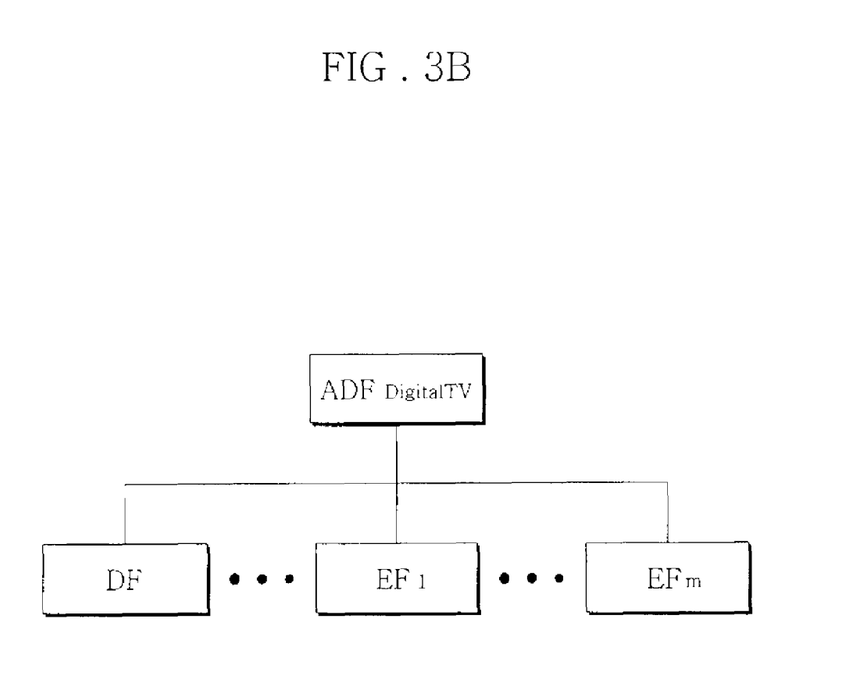

FIGS. 3A and 3B are conceptual views illustrating structures of a hierarchical file system for broadcast reception method and an apparatus according to an exemplary embodiment of the present invention.

Referring to FIG. 3A, the MF is a root directory and $EF_{DIR}$ is positioned below the MF as an inevitable element. The $EF_{DIR}$ includes identity information corresponding to the ADF. In other words, the ADFs can be identified by Application Identifier (AID) that is obtained at the $EF_{DIR}$. The AIDs are used for selecting corresponding ADFs.

In this exemplary embodiment, the SIM 300 contains a dedicated digital broadcast application file ($ADF_{DigitalTV}$) for the digital broadcast service. The $EF_{DIR}$ checks the AID of the $ADF_{DigitalTV}$ and access to the $ADF_{DigitalTV}$ using the AID.

Referring to FIG. 3B, the $ADF_{DigitalTV}$ consists of a plurality of DFs and EFs for the digital broadcast service according to the present invention.

Although the SIM 300 is described with a file system having a hierarchical architecture as depicted in FIGS. 3A and 3B, the present invention is not limited thereto. For example, the MF can be implemented with a plurality of DFs, such as a $DF_{DVB-H}$, $DF_{S-DVB}$, $DF_{MediaFLO}$, and their EFs for executing corresponding broadcast services. The DFs can be structured independently below respective ADFs. Also, a plurality of ADFs can be provided for different digital broadcast systems.

An operation of the above-structured UE is described hereinafter in detail.

Figure 4:
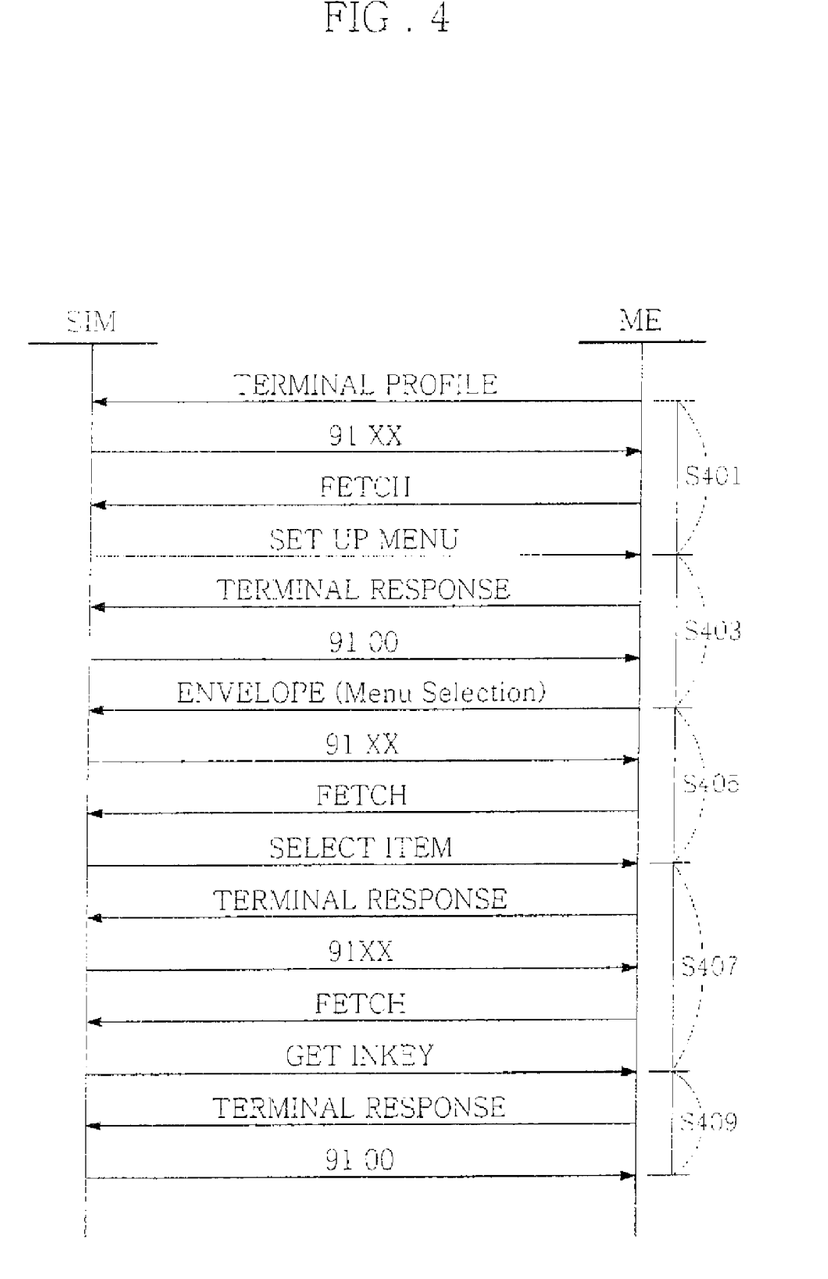
FIG. 4 is a signaling diagram illustrating a broadcast reception method of a UE according to an exemplary embodiment of the present invention.

FIG. 4 comprises a signaling diagram illustrating a broadcast reception method of a UE according to an exemplary embodiment of the present invention.

Referring to FIG. 4, if the UE 100 is switched on, the ME 200 sends the Terminal Profile to the SIM 300 (S401). In response to the Terminal Profile, the SIM 300 sends a "91xx" as a Status response Word (SW). Upon receiving the "91xx" message, the ME 200 sends the FETCH function to the SIM 300. Here, the Terminal Profile informs the SIM 300 of the SAT functionalities supported by the ME 200.

After receiving the FETCH function, the SIM 300 sends a Set Up Menu command to the ME 200 (S403). Upon receiving the Set Up Menu command, the ME 200 sends a Terminal Response command to the SIM 300. In response to the Terminal Response command, the SIM 300 sends "91 00" as SW to the ME 200. Here, the SIM 300 provides the ME 200 with a menu list through the Set Up Menu command.

Next, the ME 200 sends an Envelope command (Menu Selection) to the SIM 300 (S405). In response to the Menu Selection command, the SIM 300 sends "91xx" as the SW to the ME 200. Upon receiving the SW "91xx", the ME 200 sends the FETCH function to the SIM 300. Here, the ME 200 requests a menu list required for the digital broadcast using the Envelope (Menu Selection) command and the SIM 300 provides the menu list in response to the Menu Selection command. The menu list received from the SIM 300 is displayed on the screen of the display unit 240.

Table 1 shows an exemplary menu list sent by the SIM 300 for the digital broadcast service.

TABLE 1

| Menu List | | |
|---|---|---|
| Menu | | Option or Submenu |
| 1 Broadcast Schedule | 1-1 | Detailed Information View |
| | 1-2 | Program Playback |
| | 1-3 | Purchase |
| Purchased Items | 2-1 | Detailed Information View |
| | 2-2 | Program Playback |
| Settings | 3-1 | Program Info Update Setting |
| | 3-2 | Alarm Setting |
| | 3-3 | Adult Authentication Key Setting |

As shown in Table 1, the menu list includes main menus of the broadcast schedule, purchased items, and settings. The broadcast schedule menu provides the submenu options of the detailed information view, program playback, and purchase; the purchased items menu provides the submenu options of detailed information view and program playback; and the settings menu provides the submenu options of the program information update setting, alarm setting, adult authentication key setting. The menu list of Table 1 is only an example, and a person of ordinary skill in the art understands and appreciates that the number and titles of the menu and submenu items can be varied in accordance with the type of the application.

Referring again to FIG. 4, after receiving the FETCH command, the SIM 300 sends a Select Item command to the ME 200 (S407). In response to the Select Item command, the ME 200 can select a menu from the menu list and sends a Terminal Response command to the SIM 300. If the Terminal Response command is received, the SIM 300 sends the SW "91 xx" to the ME 200, and the ME 200 sends the FETCH function to the SIM 300 in response to the SW.

Next, the SIM 300 sends a Get Inkey command to the ME 200 (S409), and the ME 200 sends the Terminal Response command to the SIM 300 in response to the Get Inkey command so as to execute the selected menu. Consequently, the SIM 300 sends the SW "91 00" to the ME 200.

In accordance with the above described exemplary procedure, the SIM 300 provides menu to the ME 200. The menu items on the menu list provided by the SIM 300 are described hereinafter in more detail.

As shown in Table 1, the settings menu is provided with the submenus of "Program Information Update Setting", "Alarm Setting", and "Adult Authentication Key Setting."

The Program Information Update Setting menu is of setting the ESG update cycle such that the ESG is periodically received according to the ESG update cycle set by the user. If a new ESG is received through the broadcast reception unit 220, the new ESG is delivered to the SIM 300 such that the SIM 300 maintains a latest ESG by storing the ESG within an $EF_{ESG}$.

In the case of a conventional DVB-H system, the broadcast reception unit 220 receives the broadcast signals using the time slicing technique and extracts transport stream packet from the broadcast signals. Next, the broadcast reception unit 220 extracts IPv6 datagram from the TS packet through an error correction process such as MPE-FEC. The broadcast reception unit 220 separately extracts FLUTE/ALC protocol data and RTP protocol data from the datagram. The RLUTE/ALC protocol data contains broadcast information such as ESG, and RTP protocol data contains the video and audio data. Since the ESG is carried by the FLUTE/ALC protocol data, the user equipment should obtain the new ESG through such complex processes whenever it enters the digital broadcast mode.

Unlike the operation of a conventional system disclosed above, the broadcast reception method of the present invention is advantageous in that the ESG can be provided using the $EF_{ESG}$. In the case of the DMB system, the EPG is provided using the $EF_{EPG}$.

The Alarm Setting menu provides setting a time of a specific program of a service channel to be aired by storing an identifier and scheduled time of the program within the $EF_{SetAlarm}$. The alarm is preferably using the Play Tone command among the proactive commands.

The Adult Authentication Key Setting menu is preferably used for updating the $EF_{ParentalCode}$ such that the Adult Authentication Key is updated and stored within $EF_{ParentalCode}$ through the Adult Authentication Key menu. The Adult Authentication is performed by comparing a pin code input by the user and the parental code stored within the $EF_{ParentalCode}$.

In association with the above-exampled menu list, an example of a broadcast reception method according to the present invention is described hereinafter.

Figure 5:
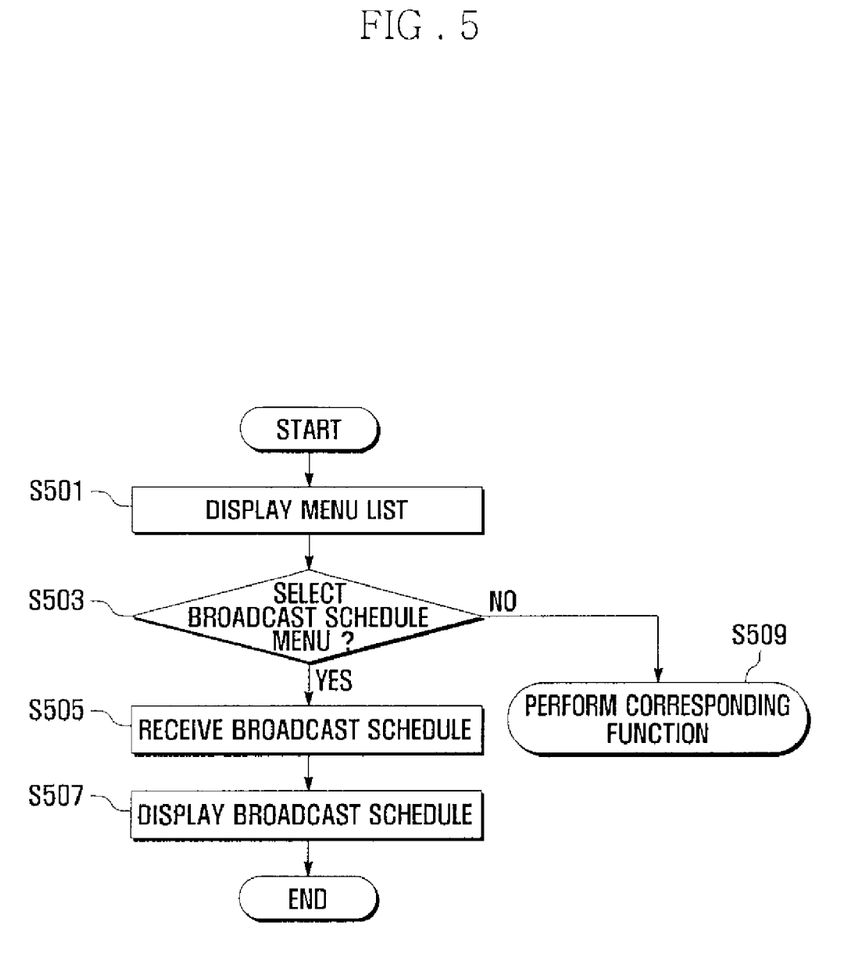
FIG. 5 is a flowchart illustrating a broadcast reception method according to an exemplary embodiment of the present invention.

FIG. 5 is a flowchart illustrating a broadcast reception method according to an exemplary embodiment of the present invention.

Referring to FIG. 5, if a menu list is received from the SIM 300, the ME 200 displays the received menu list on a screen (S501). The menu list is preferably structured as shown in the example in Table 1. The Envelope (Menu Selection) command allows the ME 200 to select an item from the menu list. The user can select a menu item with reference to the menu list.

At step (S503) the ME 200 monitors for a user input and determines, if a user input is detected, whether the user input comprises a selection of the Broadcast Schedule menu (S503). If the user input is a selection of the Broadcast Schedule menu, the ME 200 receives the broadcast schedule from the SIM 300 (S505) and displays the broadcast schedule on a display (S507).

The broadcast schedule is provided by the $EF_{ShowTvGuide}$ stored in the SIM 300 and the $EF_{ShowTvGuide}$ can be implemented with the information extracted from the $EF_{ESG}$. As the SIM 300 updates and maintains the recent ESG, the latest broadcast schedule can be provided on the basis of the recent ESG through the $EF_{ShowTvGuide}$.

However, if the user input is not of selecting the Broadcast Schedule menu, the ME 200 performs a function associated with a menu corresponding to the user input (S509).

If a series of user inputs for selecting a program from the on-screen broadcast schedule and for playing the selected program are detected, the SIM 300 then executes a Launch Mobility command such that the ME 200 starts playing the selected program.

The Launch Mobility command comprises a proactive command for setting a service channel using an identifier assigned to the service channel and for playing the selected service channel.

An example of a pay program purchase procedure of the broadcast reception method is described hereinafter.

Figure 6:
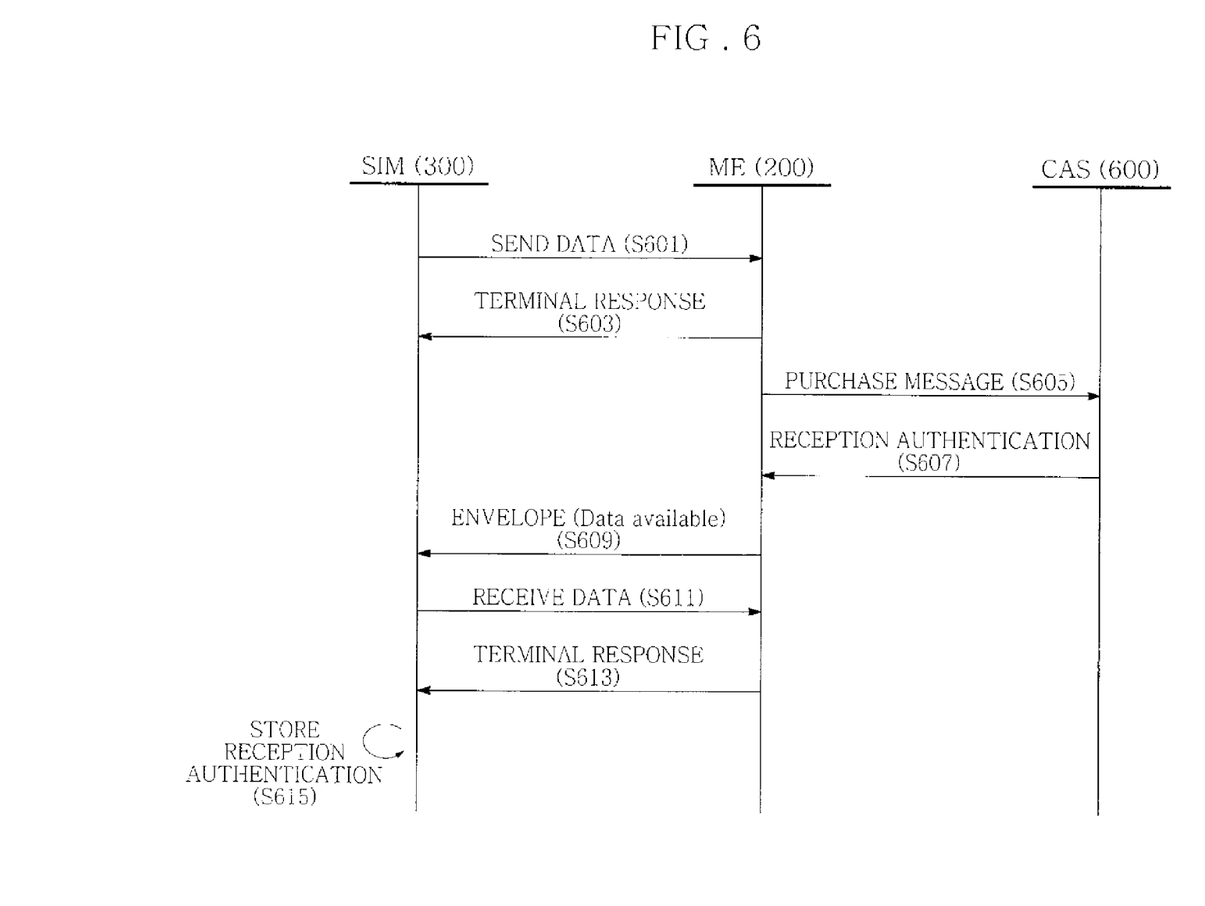
FIG. 6 is a signaling diagram illustrating a pay program purchase procedure of a broadcast reception method according to an exemplary embodiment of the present invention.

FIG. 6 is a signaling diagram illustrating a pay program purchase procedure of a broadcast reception method according to an exemplary embodiment of the present invention.

The pay program purchase procedure can be initiated, for example, by selecting the Purchase which is a submenu of the Broadcast Schedule menu as shown in Table 1.

The pay program purchase procedure can be implemented with a Conditional Access System (CAS) which allows only the subscriber to receive the program. The CAS gives an authorization for the subscriber to receive the purchased program. The CAS can be provided with a billing server for recording the purchase, an Entitled Control Message (ECM) server for generating the ECM by ciphering the control word (CW), and an Entitled Management Message (EMM) server for generating the EMM.

Referring to FIG. 6, the SIM 300 typically sends a Send Data command to the ME 200 (S601). The Send Data command includes purchase data for buying a pay (premium) program. For example, the purchase data may include a smartcard key, pay program identifier, etc. The smartcard key is for identifying the purchaser, i.e. verifying the SIM 300. The smartcard key is an authentication key for deciphering the ciphered reception authorization. The pay program identifier is used for identifying a target program.

If the Send Data command from the SIM (300) is received, the ME 200 sends a Terminal Response command to the SIM 300 (S603) and a purchase message containing the purchase data to the CAS 600 (S605). If the purchase message is received, the CAS 600 sends a ciphered reception authentication message to the ME 200 (S607).

If the reception authentication message is received, the ME 200 sends an Envelope (Data available) command to the SIM 300 (S609) for indicating the data to be received. In response to the Envelope command, the SIM 300 sends a Receive Data command to the ME 200 (S611). Consequently, the ME 200 sends a Terminal Response command containing the reception authentication to the SIM in response to the Receive Data command (S613) such that the SIM 300 stores the reception authentication.

The reception authentication can be stored, for example, with a mapping to the purchased program.

In this exemplary embodiment, the purchased program is stored in the form of $EF_{PurchasedProgram}$. Accordingly, the SIM 300 stores the purchased program and the reception authentication for the program within the $EF_{PurchasedProgram}$.

An example of a purchased program management procedure of a broadcast reception method of the present invention is described hereinafter.

Figure 7:
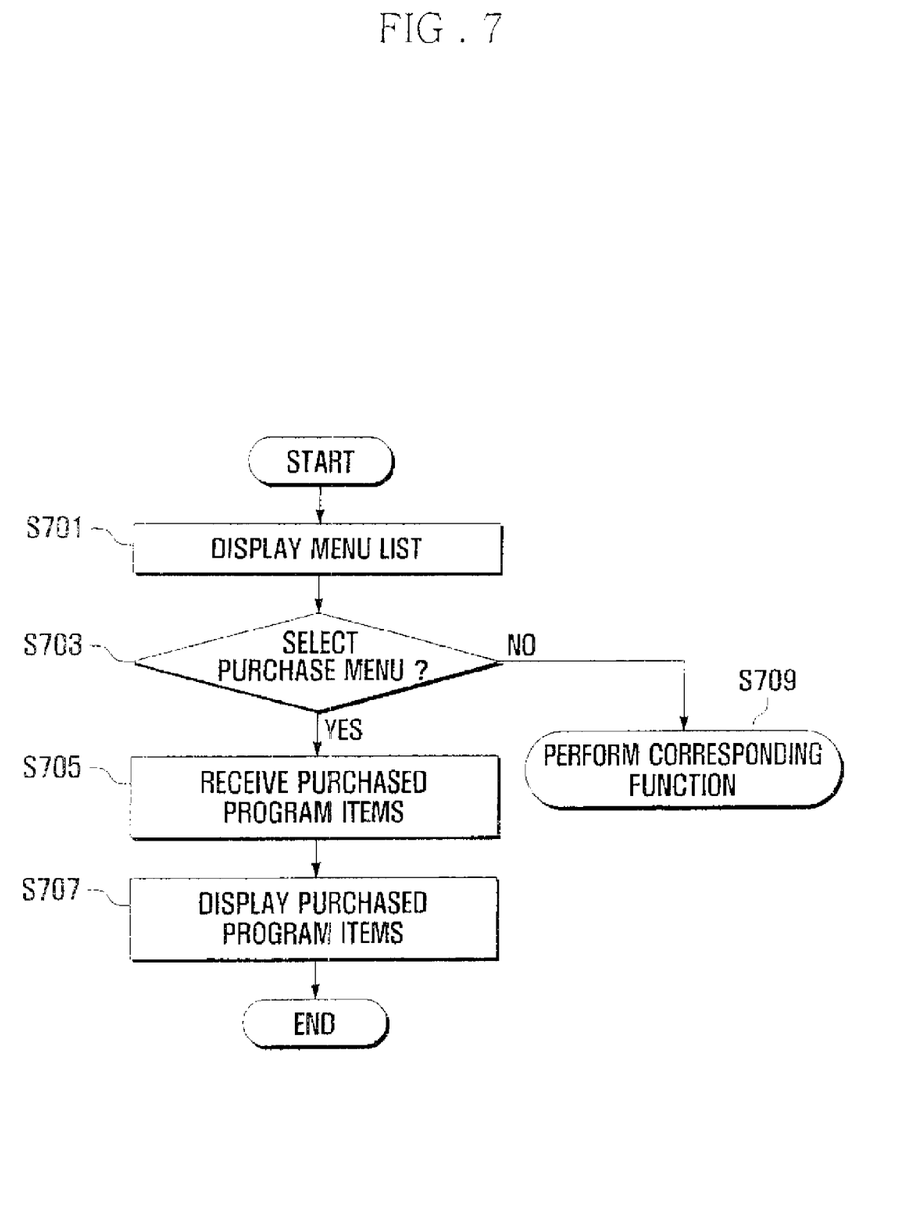
FIG. 7 is a flowchart illustrating a purchase program management procedure of a broadcast reception method according to an exemplary embodiment of the present invention.

FIG. 7 is a flowchart illustrating a purchase program management procedure of a broadcast reception method according to an exemplary embodiment of the present invention.

Referring to FIG. 7, if a menu list is received from the SIM 300, the ME 200 displays the menu list on the screen (S701). The menu list is preferably structured in the form shown in Table 1. The Envelope (Menu Selection) command allows the ME 100 to select an item from the menu list. The user can select a menu item with reference to the menu list.

While the menu list menu list is displayed, the ME 200 monitors for detection of a user input and determines, if a user input is detected, whether the user input is a selection of a Purchase menu (S703). If the user input is not provided for selection of the Purchase menu, the ME 200 performs a function corresponding to a menu item selected by the user (S709).

If the user input is for selection of the Purchase menu, the ME 200 receives the purchased program items (S705) and displays the purchased program items on the screen (S707). The purchased program items are stored within an $EF_{PurchasedProgram}$. As the pay program item and reception authentication are recorded within the $EF_{PurchasedProgram}$ whenever a program item is purchased, the ME 200 provides only the purchased items with reference to the $EF_{PurchasedProgram}$. It should be understood and appreciated by a person of ordinary skill in the art that the terminology used to identify the purchased program could be something other than EF$_{PurchasedProgram}$, which is provided for explanatory purposes, and a different name would not depart from the spirit of the invention and scope of the appended claims.

If one of the purchased program items is selected by the user, the ME 200 descrambles and plays the program using the reception authentication corresponding to the program. Accordingly, there is no need to receive a key value again. As in FIG. 5, in response to the key input for playing a program, the SIM 300 executes a Launch Mobility command such that the ME 200 starts playing the selected program.

Although the pay program purchase procedure of the broadcast reception method is depicted with the CAS in FIGS. 6 and 7, the present invention is not limited thereto. For example, the pay program purchase procedure can be implemented with, for example, a Digital Rights Management (DRM) system.

Although exemplary embodiments of the present invention have been described in detail hereinabove, it should be clearly understood that many variations and/or modifications of the basic inventive concepts herein taught which may appear to those skilled in the present art will still fall within the spirit of the present invention and the scope of the appended claims. In this particular case, the UE receives a Right Object File from the DRM server and stores the Right Object File within the EF$_{PurchasedProgram}$ together with the purchased program item.

As described in the above examples, the broadcast reception method of the present invention allows a UE to store applications and files associated with the digital broadcast service, thereby facilitating reception of the digital broadcast service. The broadcast reception method of the present invention is advantageous in update and extension of the application and with parameters associated with the broadcast service. For example, the ciphering algorithm for a pay program purchase procedure can be updated or extended using the OTA technique.

As described above, the broadcast reception method of the present invention is also advantageous in that the cumbersome user manipulation repeatedly required whenever receiving a pay program can be skipped by storing the application and files associated with the digital broadcast service. Since the applications and files are stored in the SIM, the broadcast reception apparatus and method facilitate coping with changes in the broadcast system, mobile operator, and user equipment.

What is claimed is:

1. A user equipment comprising:
 a subscriber identity module (SIM) or a universal subscriber identify module (USIM) for storing files associated with a digital broadcast service; and
 a mobile equipment (ME) for executing a broadcast application using the files stored in the SIM or USIM:
 wherein the SIM or USW includes a respective SIM Application Toolkit (SAT) or USIM Application Toolkit (USAT) and a communication interface between the SW or USIM and the ME in which application data files are provided to the ME and periodically updated via an elementary file EF in the SIM or USIM that stores the application data files; and
 wherein the SAT or USAT is restricted for operation to the user equipment.

2. The user equipment of claim 1, wherein the SIM or USIM includes updating files stored in the SIM or USW using the over the air (OTA) technique, and wherein the application data files include an Electronic Service Guide (ESG) updated and stored in the STM or USIM for communication to the ME.

3. The user equipment of claim 1, wherein the files stored in the SIM or USIM includes a key for buying a pay program.

4. The user equipment of claim 1, wherein the files include a purchased program and reception authentication.

5. The user equipment of claim 1, wherein the files comprise at least one application dedicated file, at least one dedicated file, and at least one elementary file.

6. The user equipment of claim 1, wherein the files comprise at least one of elementary file and dedicated file stored in the SIM or USIM and containing broadcast information.

7. The user equipment of claim 1, wherein the files comprise at least one elementary file stored in the SIM or USIM for storing at least one of a broadcast schedule, a purchased program item, and an adult authentication key.

8. The user equipment of claim 1, wherein the files comprise at least one application dedicated file stored in the SIM or USIM for storing a digital broadcast application.

9. The user equipment of claim 1, wherein the ME includes a radio frequency (RF) unit for transmitting and receiving radio signals, a broadcast reception unit for selectively receiving the broadcast data of the service channel selected by a subscriber, a control unit comprising an access module for accessing the SIM and a reading module for reading field values of the files contained in the SIM.

10. A broadcast reception method for a user equipment including a subscriber identity module (SIM), comprising:
 displaying a menu list stored in the SIM having menu items associated with a digital broadcast service;
 executing, selectively, files corresponding to the menu items, the file being stored in the SIM; and
 periodically updating and storing in the SIM at least one of the menu list and the files corresponding to the menu items;
 wherein the files arc restricted for operation to the user equipment.

11. The broadcast reception method of claim 10, wherein the files stored in the SIM comprise at least one application dedicated file (ADF), at least one dedicated file (DF), and at least one elementary file (EF).

12. The broadcast reception method of claim 10, wherein the files stored in the SIM comprise at least one of elementary file and one dedicated file containing broadcast information.

13. The broadcast reception method of claim 10, wherein the files stored in the SIM comprise at least one elementary file for storing at least one of a broadcast schedule, a purchased program item, and an adult authentication key.

14. The broadcast reception method of claim 10, wherein the files stored in the SIM comprise at least one application dedicated file for storing a digital broadcast application.

* * * * *

UNITED STATES PATENT AND TRADEMARK OFFICE
CERTIFICATE OF CORRECTION

| | | |
|---|---|---|
| PATENT NO. | : 8,032,180 B2 | Page 1 of 1 |
| APPLICATION NO. | : 11/952168 | |
| DATED | : October 4, 2011 | |
| INVENTOR(S) | : Yong Seock Choi | |

It is certified that error appears in the above-identified patent and that said Letters Patent is hereby corrected as shown below:

Column 9, Claim 1, Line 56 should read as follows:
-- ...wherein the SIM or USIM includes... --

Column 9, Claim 1, Line 58 should read as follows:
-- ...between the SIM... --

Column 10, Claim 2, Line 7 should read as follows:
-- ...or USIM using... --

Column 10, Claim 2, Line 10 should read as follows:
-- ...stored in the SIM or... --

Signed and Sealed this
Seventeenth Day of July, 2012

David J. Kappos
*Director of the United States Patent and Trademark Office*